UNITED STATES PATENT OFFICE.

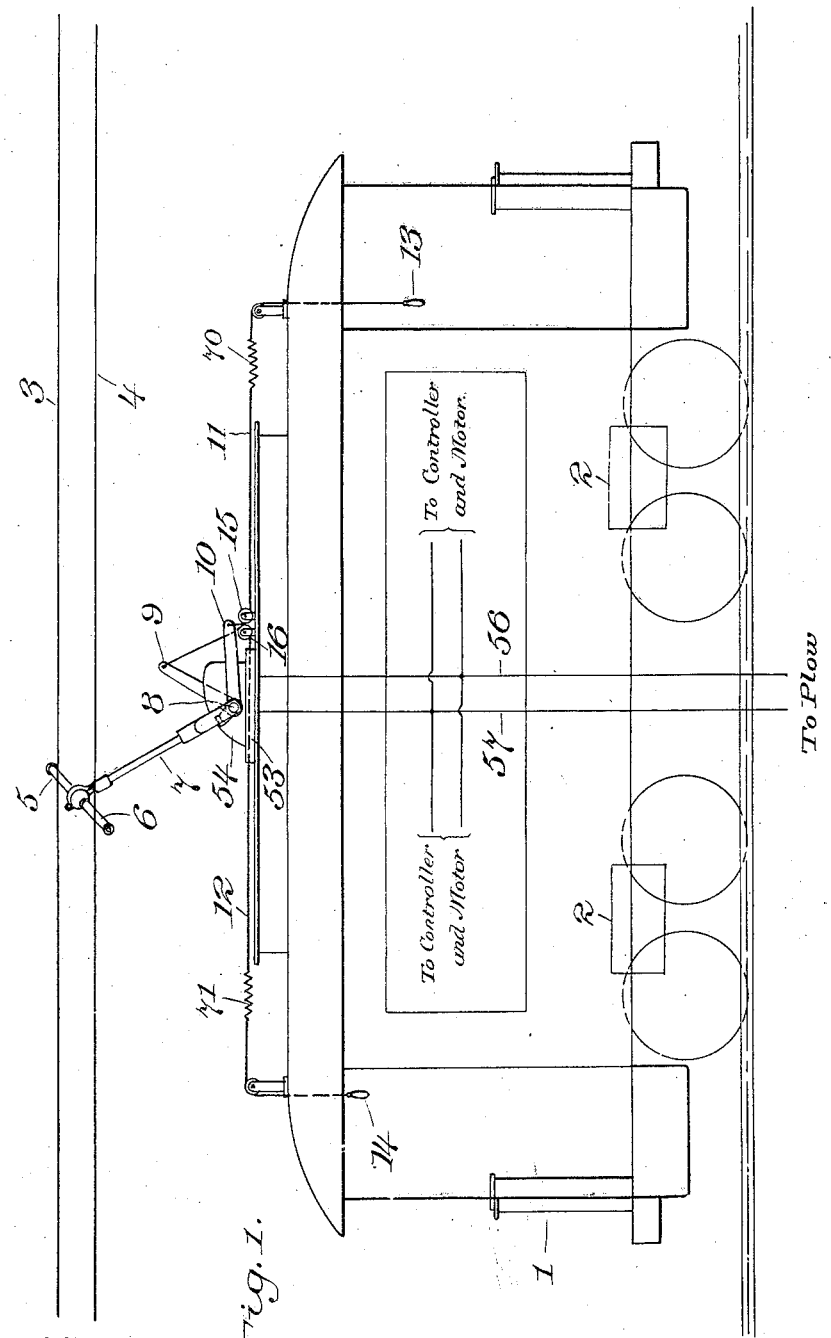

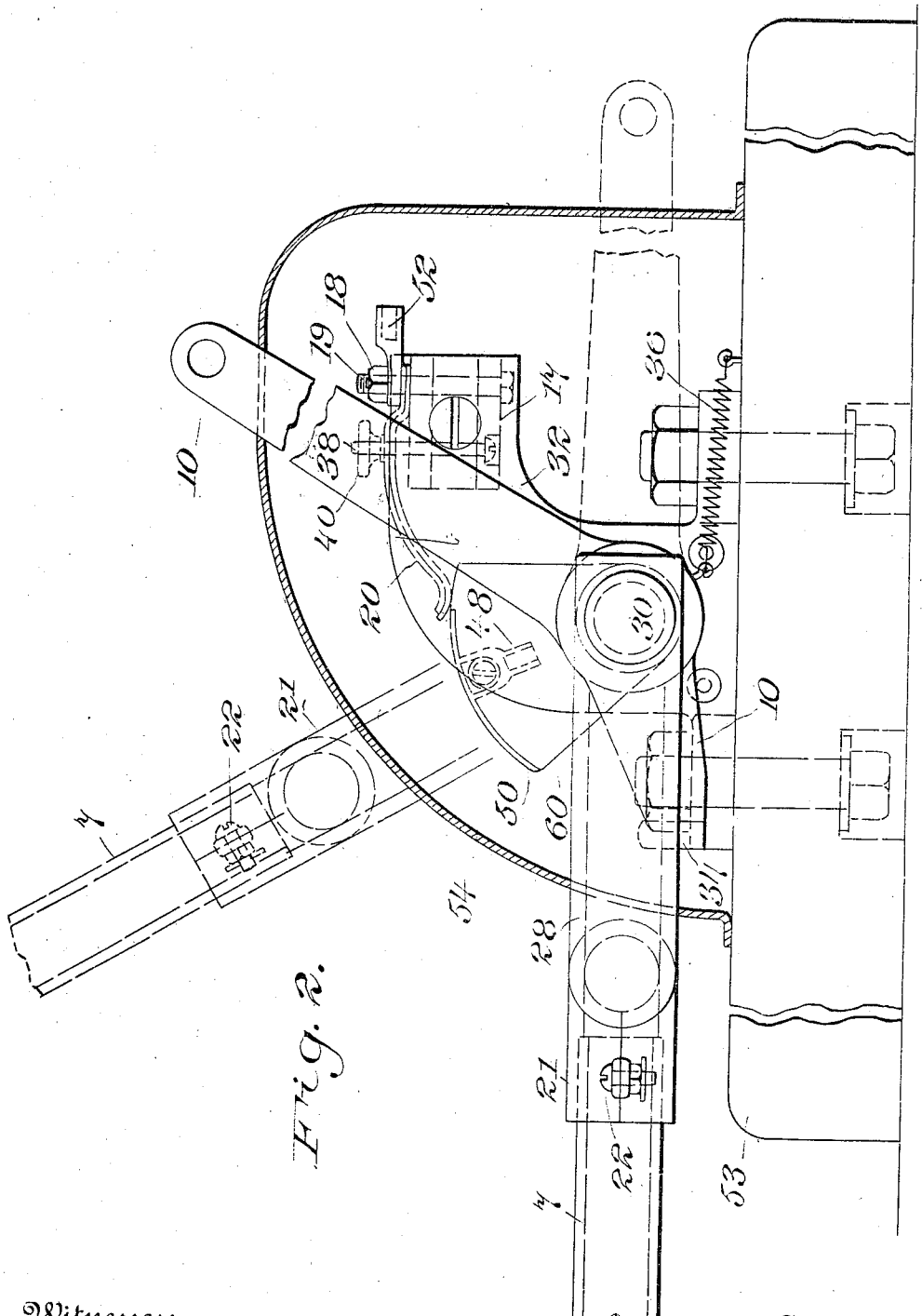

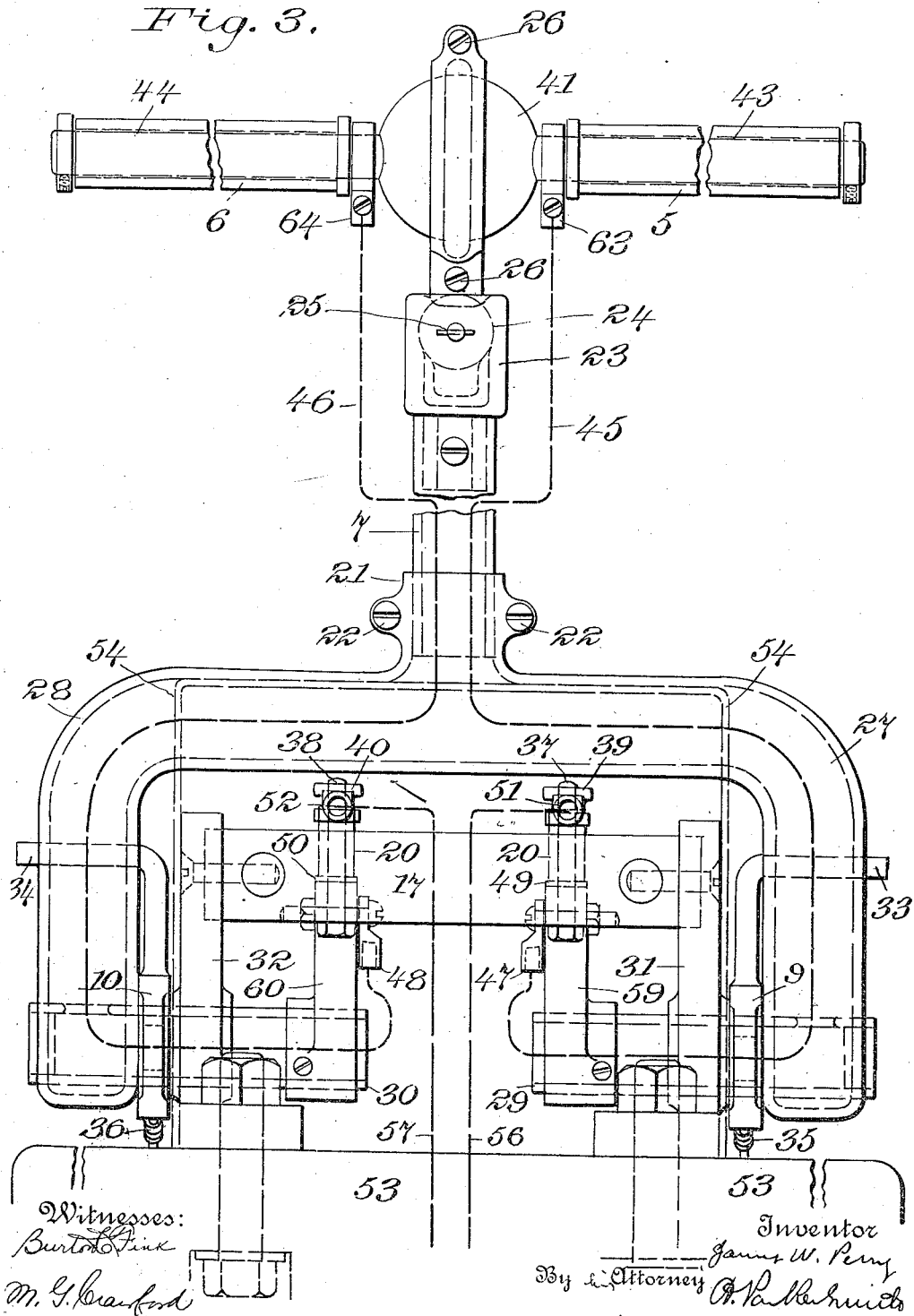

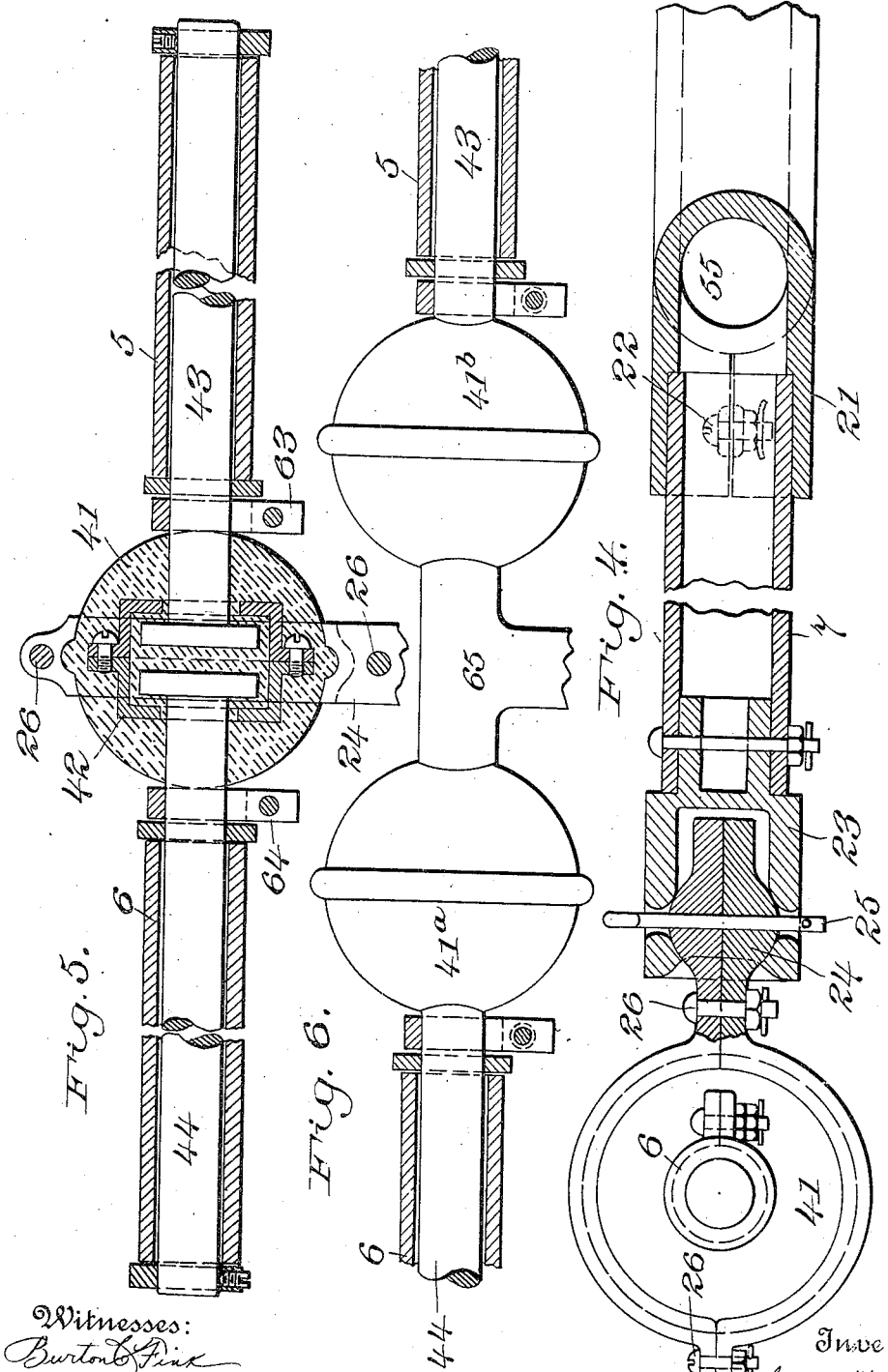

JAMES W. PERRY, OF NEW YORK, N. Y., ASSIGNOR TO H. W. JOHNS-MANVILLE COMPANY, A CORPORATION OF NEW YORK.

CAR-BARN TROLLEY ATTACHMENT.

No. 907,522.  Specification of Letters Patent.  Patented Dec. 22, 1908.

Application filed June 6, 1908. Serial No. 437,047.

*To all whom it may concern:*

Be it known that I, JAMES W. PERRY, a citizen of the United States of America, and a resident of the borough of Manhattan, city, county, and State of New York, have invented certain new and useful Improvements in Car-Barn Trolley Attachments, of which the following is a specification.

My invention relates to electric trolley cars generally and comprises improved means for operating such cars in the car barns.

In the last few years a great many extremely costly fires have occurred in large car barns in the cities where the underground trolley or conduit system of electric railroads is in use. These fires have been traced to defective insulation and short circuits in cars stored in said barns with their trolleys or other current collectors in contact with the trolley wires or rods by which current is supplied for operating the cars in the car barns. In the case of cars operated on the conduit system, this danger is especially prevalent. The plow is left in the conduit in the car barn in contact with the conductors in said conduit and if the motorman does not open his safety switch on leaving the car, and even in some cases where he does so, there is a possibility of a short circuit arising through the breaking down of insulation or otherwise, which produces an arc and local heating in the plow or in the car. This soon sets the car afire and hundreds of thousands of dollars worth of property may be destroyed. My invention overcomes these difficulties by rendering it possible to completely disable the ordinary current collecting means on the trolley car when the same enters the barn, as by removing the plow or removing the conductors or conduits in the car barn. I then obtain the propulsion force for shifting the cars in the car barn from an overhead trolley wire or wires with which a short trolley arm engages when lifted by the motorman, but said trolley arm being normally down and having no springs or other means for forcing it up into contact except the pull of the motorman, cannot be left in engagement with the current supply conductor, consequently the car and all its electrical connections are dead except for the periods of time during which the motorman will force the trolley up into contact with the trolley wires in order to acquire enough momentum to kick the car down the track to its place of storage in the car barn.

The best form of apparatus at present known to me embodying my invention is illustrated in the accompanying sheets of drawing in which:

Figure 1 is a diagrammatic view of an electric trolley car with my invention applied thereto. Fig. 2 is a detail side view of the trolley attachment with the side of the casing removed. Fig. 3 is a front elevation of the same with the outline of the casing indicated in broken lines. Fig. 4 is a detail central section of the trolley arm and end view of the trolley head. Fig. 5 is an axial section of the trolley head, and Fig. 6 illustrates a modified form of trolley head.

Throughout the drawings, like reference figures indicate like parts.

1 represents the car, and 2, 2, the electric motors therefor.

3 is the positive trolley wire and 4 the negative or return wire; 5 is the trolley or roller engaging the positive wire 3, and 6 the trolley engaging the wire 4.

7 represents the trolley arm, and 8 indicates the trolley arm pivot generally.

9 is the right hand bell crank lever for lifting the trolley arm, and 10 the left hand bell crank lever, looking along the roof of the car from right to left of Fig. 1.

11 is the cord extending from the right hand platform of Fig. 1 to the bell crank lever 9 and terminating in the handle 13 within reach of the motorman standing on the platform. 12 is a cord running to the other platform connected to the bell crank lever 10 and terminating in a handle 14. The cord 11 runs under guide roller 15 and the cord 12 under the guide roller 16, so that a pull on the handle of either cord will result in pulling down the bell crank lever connected thereto and forcing up the trolley arm.

Within the casing or cover 54 is the mechanism by which the trolley arm is supported, all said mechanism and cover resting upon the insulating piece 53. This mechanism comprises two housings 31 and 32 connected by the insulating cross bar 17. This cross bar has mounted on it contact springs 20 held in place by bolts 19 and nuts 18, and adjusted by tension bolts 37, 38 and thumb nuts 39 and 40. Connected to these contact springs are the socket pieces 51 and 52 to which are connected ordinary conducting wires not shown, through which current passes to the controller and motor. These connections are diagrammatically represented in Fig. 1 by wires 56 and 57.

Coöperating with the contact springs 20 are contact arcs 49 and 50 on sectors 59 and 60, which are mounted on the pivot shafts 29 and 30. These pivot shafts are rigidly connected to the two branches 27 and 28 of the forked lower end of the trolley arm, and are journaled in the housings 31 and 32. The whole construction is hollow and the upper end of the trolley arm socket 21 is split to receive the main portion of the trolley arm 7 which is clamped in place by the screw bolt 22. The upper end of the trolley arm 7 receives the socket 23 in which the spherical member 24 is loosely placed and held within certain limits of movement by the split pin 25. This spherical member 24 is extended and formed in two parts as shown in Fig. 4, which parts are held together by bolts 26, 26, or other convenient means and inclose a ball of molded insulating material 41. In this insulating material 41 is a two-part metallic coupling 42 within which are the enlarged heads of the roller bearing shafts 43 and 44. On these shafts outside of the insulation 41 are mounted the contact collars 63 and 64 to which are connected conductors 45 and 46 passing down the trolley arm through the hollow fork at the lower end of the trolley arm and through the hollow pivot shafts to the contact sockets 47 and 48 which are connected to the contact arcs 49 and 50 on the sectors 59 and 60. This affords a metallic connection from each contact arc to the trolley roller on each side and the conductors 45 and 46 passing through the opening 55 into the interior of the hollow trolley arm are well protected.

On each pivot shaft is loosely journaled a bell crank lever just outside of the casing 54. The bell crank lever 9 has a laterally extending toe 33 on its short arm which extends under the branch 27 of the trolley arm fork and has a retracting spring 35 which normally tends to hold it in the position shown in full lines in Fig. 2. Similarly, the bell crank lever 10 has a laterally projecting toe 34 engaging the branch 28 of the trolley arm fork and a retracting spring 36.

Such being the construction of my apparatus, the operation is as follows: Normally, the trolley arm is down, resting upon the roof of the trolley car and the contact arcs 49 and 50 are out of contact with the contact springs 20, 20. Thus the possible connection between the trolley wire and the motor circuit is broken at two points. Normally, the car is driven over the track by current derived from the plow running in the conduit in the usual manner, or by an independent overhead contact device not shown. When the car enters the car barns the plow is removed, or the conductors are removed from the conduit and special trolley wires 3 and 4 are arranged over all the tracks and switches in the barn. In order to operate his car, the motorman must then seize one of the handles 13 or 14, and pull down on the same, thus rotating the bell crank lever connected to it and lifting the trolley arm and trolley. At or before the time the trolley rollers touch the trolley wires, the contact arcs touch the contact springs 20 and the electric circuit is established through the conductors on the trolley arm and the motor circuit on the car. This will shoot the car forward and the motorman can then release the handle, shutting off the current and depend upon the momentum to drive his car under control of the brake to the desired point or of course he can retain the trolley in contact as long as is necessary. As soon as the motorman lets go of the cord handle, the trolley arm drops and the car is dead. The ball and socket joint 23, 24, enables the two-part trolley to adjust itself to the two trolley wires.

The advantages of my invention comprise the elimination of fire risk by substituting for ordinary current collecting devices of the car a current collecting apparatus normally out of contact with the current conductors so that normally the car is protected from all possibility of leakage currents and the positive intervention of an operator is required in order to obtain the momentary flow of current necessary to shift the car from one place to another within the barns.

In the modified trolley head shown in Fig. 6, there is a central T-piece 65, and two balls of insulating material 41$^a$ and 41$^b$ carried on the ends of the T, support the trolley roller shafts 43, 44 as before.

Of course also the trolley may be moved into operative position by the motorman through any means within his control other than the handles 13 and 14, by having the cords or their equivalent connections extend to any other movable member within reach of his hand or foot.

While it is most convenient to have the operative connections extend to within reach of the motorman, of course the principle of my invention might still be retained if the trolley arm were manually controlled by any other operator, so long as it requires positive action on the part of the operator to hold the trolley in contact, and contact is immediately and automatically broken as soon as the positive action of the operator ceases.

70 and 71 represent springs inserted in the cords 11 and 12 to take up any inequality or unevenness in the trolley wires.

Having, therefore, described my invention, I claim:

1. The combination with a railroad car, an electric motor mounted thereon, a trolley having circuit connections to the motor, and a trolley arm pivoted to said car and normally lying down upon the roof of the car, of connections by which the motorman may control the trolley arm to lift the trolley into temporary contact with the trolley wire and hold it there at will, said trolley arm falling by its own weight to disengage the trolley from the trolley wire when the motorman releases his immediate control of said connections.

2. The combination with a railroad car, an electric motor mounted thereon, a trolley having circuit connections to the motor, and a trolley arm pivoted to said car and normally lying down upon the roof of the car, of connections by which the motorman may control the trolley arm to lift the trolley into temporary contact with the trolley wire and hold it there at will, said trolley arm falling by its own weight to disengage the trolley from the trolley wire when the motorman releases his immediate control of said connections, said connections comprising bell cranks on the pivot shaft of the trolley arm, and cords extending from said bell cranks to each end of the car within reach of the motorman.

3. The combination with an electric car, a trolley, and trolley arm pivoted to said car and normally lying down upon the roof of the car, of connections by which the motorman may control the trolley arm to lift the trolley into temporary contact with the trolley wire and hold it there at will, said trolley arm falling by its own weight to disengage the trolley from the trolley wire when the motorman releases his immediate control of said connections, an electric circuit in said car, and means by which the trolley is automatically connected with said circuit when raised and disconnected therefrom when lowered.

4. The combination with a wheeled vehicle, an electric motor, a hinged current collector mounted on said vehicle, in circuit with the electric motor when in operative position, but normally resting in a position to keep it out of contact with any coöperating stationary current conductor, of connections by which the operator may positively control the hinged current collector to force it into temporary contact with the current conductor, said trolley arm automatically returning to a position out of such contact when the operator releases his positive control of the connections.

5. In an electric railroad system the combination with underground conductors and a car provided with contact making devices therefor, of a storage section for said railroad from which the underground conductors are omitted, overhead conductors for said storage section, a trolley mounted on the car adapted to normally remain out of engagement with the overhead conductors, and means controlled by the motorman for forcing the trolley into temporary contact with the overhead conductor and holding it there only while the motorman positively exercises his control of said means, said trolley arm falling by its own weight whenever said positive control is released.

6. In an electric railroad system the combination with underground conductors and a car provided with contact making devices therefor, of a storage section for said railroad provided with overhead conductors, a trolley mounted on the car adapted to normally remain out of engagement with the overhead conductors, and means controlled by the motorman for forcing the trolley into temporary contact with the overhead conductor and holding it there only while the motorman positively exercises his control of said means, said trolley arm falling by its own weight whenever said positive control is released.

7. The combination with a trolley arm having a bifurcated lower end and inwardly extending pivots, of a car having journal bearings for said pivots on its roof, a bell crank lever journaled on each pivot and having a laterally extending toe engaging the under side of the adjacent portion of the bifurcated end of the trolley arm, a spring for each bell crank lever normally acting to hold the free arm of said lever upward, a cord extending from the free end of one bell crank lever to one end of the car and a second cord running from the free end of the other bell crank lever to the other end of the car.

Signed at New York, N. Y. this 5th day of June, 1908.

JAMES W. PERRY.

Witnesses:
　W. F. LITTLE,
　S. H. BARNES.